INVENTORS
RICHARD F. SHANNON
& PHILIP W. SULLIVAN
BY

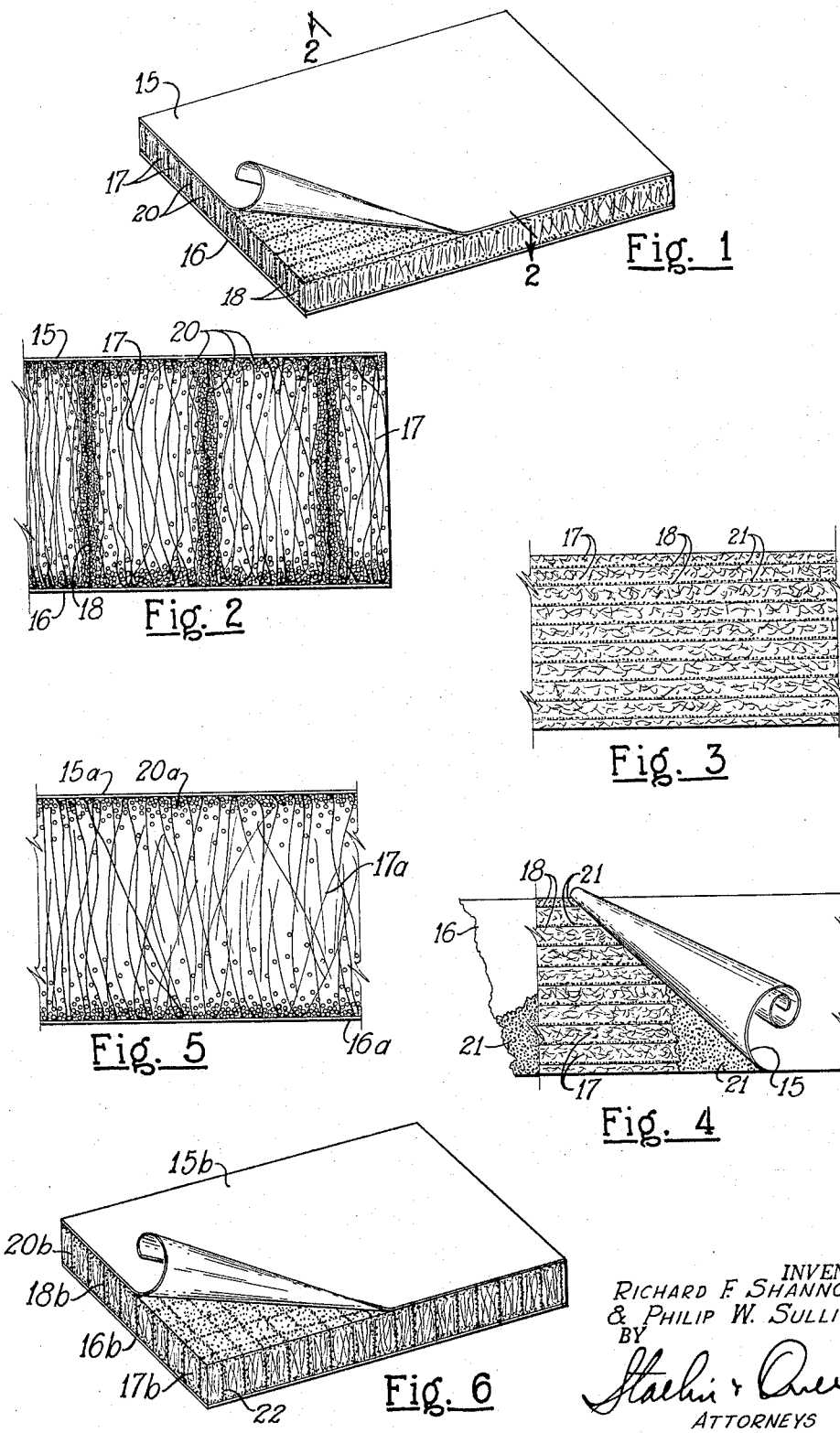

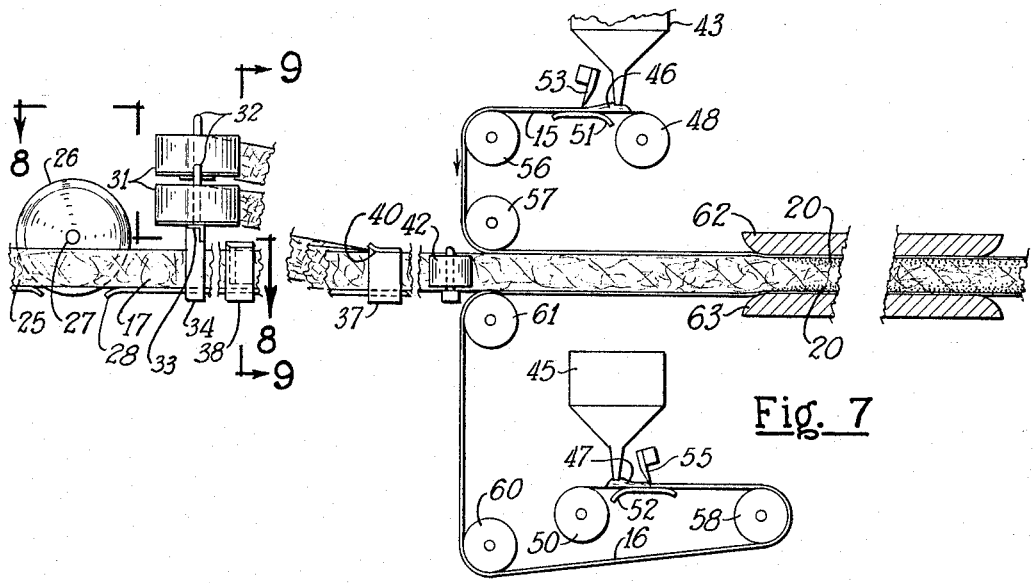
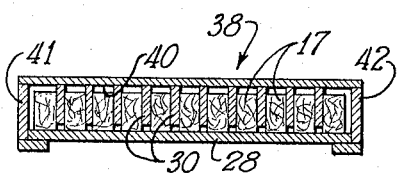
Fig. 7
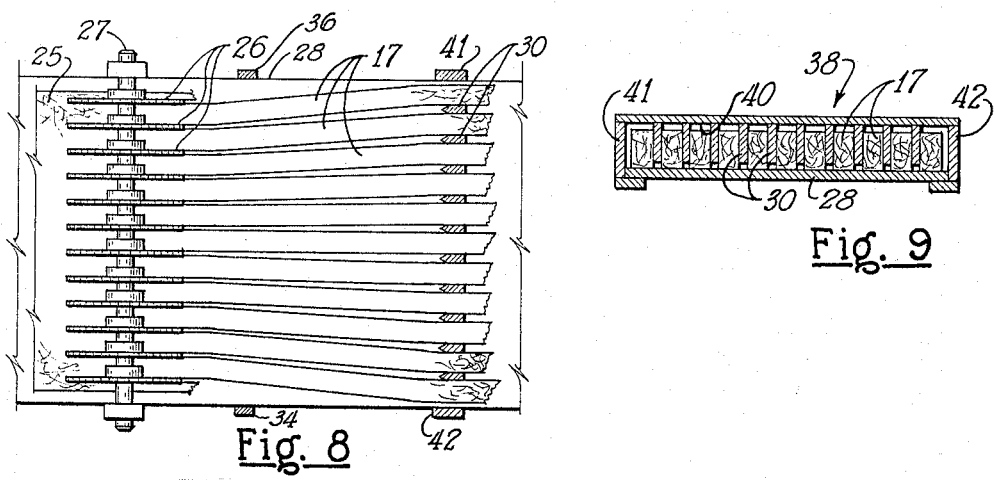
Fig. 8
Fig. 9
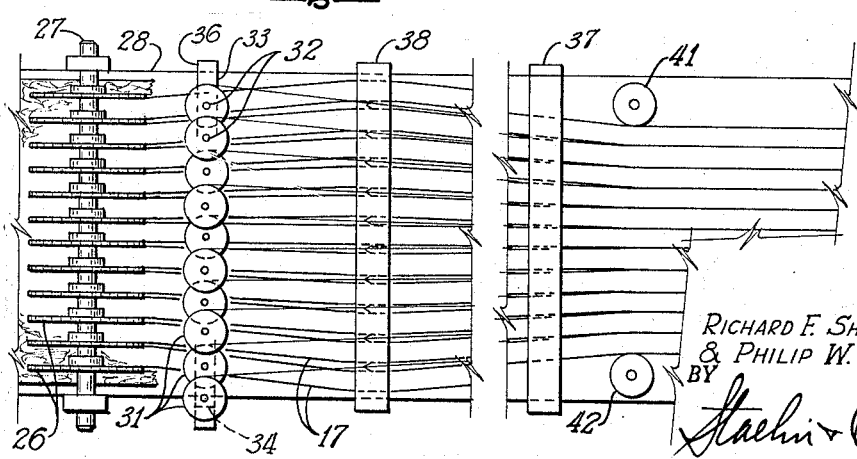
Fig. 10
INVENTORS
RICHARD F. SHANNON
& PHILIP W. SULLIVAN
ATTORNEYS

ATTORNEYS

Sept. 20, 1966 R. F. SHANNON ETAL 3,274,046
COMBINED FIBER AND CELLULAR ARTICLE
Original Filed Oct. 6, 1958 4 Sheets-Sheet 4

INVENTORS
RICHARD F. SHANNON
& PHILIP W. SULLIVAN
BY
*Staelin & Overman*
ATTORNEYS United States Patent Office 3,274,046
Patented Sept. 20, 1966

3,274,046
COMBINED FIBER AND CELLULAR ARTICLE
Richard F. Shannon, Lancaster, and Philip W. Sullivan, Newark, Ohio, assignors to Owens-Corning Fiberglas Corporation, a corporation of Delaware
Continuation of application Ser. No. 765,563, Oct. 6, 1958. This application June 1, 1964, Ser. No. 371,317
5 Claims. (Cl. 161—36)

This is a continuation of co-pending application Serial No. 765,563 filed October 6, 1958 and now abandoned.

This invention relates to a method for producing a combined fiber and cellular article and to the article produced thereby. More particularly, it relates to a method for assembling a mass of intermeshed fibers, preferably vitreous fibers, and most desirably wherein individual fibers are locked against relative movement at points of fiber-to-fiber contact by a binder material, and, in a specific instance, a foamable, curable, novolac resin-containing composition, which comprises disposing the said novolac composition adjacent a surface of the mass of fibers, and then heating at least the novolac composition to a temperature sufficient to cause foaming and cure thereof, so that the foam at least partially penetrates into the mass of fibers.

Products made from glass-fiber wool have been employed extensively in recent years in numerous and various applications. For example, their use as insulation and sound-proofing in home and industrial construction, refrigeration, acoustical tiles, and automobile construction, just to mention a few, have enjoyed marked commercial success. However, there is currently a demand for products having, in addition to the above mentioned properties, improved impact, compressive and other strengths, which the present wool packs lack, whether in the form of low density wool, or densified to a board having an apparent density of about 4 pounds per cubic foot or higher. For example, insulating roof deck having high compressive and flexural strengths would be advantageous because less frequent supports than are presently required would be adequate.

Foamable and foamed resins are currently being used to some extent, especially as insulation in appliances, often, in the case of foamable resins, foamed in situ. Foamed and foamable resinous materials are being sold in several types and forms. One such type and form is the polyurethane type foam which is shipped in the liquid form and mixed, foamed and cured on the job. A second is the expansible polystyrene bead which is shipped in pellet form and expanded on the job, usually with dry steam. A third type is a formed lightweight board, e.g., expanded polystyrene sheet. All three of these materials have inherent disadvantages. The polyurethanes are exertmely dangerous for the average person to handle since cyanide gas is given off, and they are expensive and difficult to process because of the speed with which reaction proceeds. The expansible polystyrene beads require dry steam, which is not always available, for expansion and fusion. The formed lightweight boards pose a serious cost problem in shipping, and are comparatively fragile.

It has now been discovered that by employing a new combination of a porous core material, e.g., of vitreous fibers, such as glass-fiber wool board, with a novel foamable resin or other binder, a new article is provided, which article has the desirable properties of glass fiber wool board products, and, also, excellent strength properties.

It is, therefore, an object of the invention to provide a composite structural product which will meet the growing demands of the above recited and other markets.

It is a further object of the invention to provide a new type of foamable structure which can be shipped in sheet or roll form, ready to foam, and in high density packages.

More particularly, it is a further object of the invention to provide a structural product comprising a combination of a mass of intermeshed vitreous fibers and binder, for example a cellular, cured, infusible phenol-formaldehyde condensation product, produced by the cure of a novolac, intimately associated with and bonded to at least the fibers in the mass which are adjacent a major surface thereof.

Another object of the invention is to provide a method for producing the structures described.

Other objects and advantages will be apparent from the description which follows, reference being made to the accompanying drawings, in which:

FIG. 1 is a perspective view, partially broken away, showing one form of a structural product in accordance with the invention, which form hereinafter will be referred to as the I-beam construction;

FIG. 2 is an enlarged cross-sectional view of a fragment of the I-beam construction of FIG. 1, taken substantially along the line 2—2 of FIG. 1;

FIG. 3 is a detailed sectional view showing the arrangement of the various components of the I-beam construction at an intermediate stage in the production thereof;

FIG. 4 is a detailed sectional view showing the components of FIG. 3 as they appear at a later stage in the production of the I-beam construction;

FIG. 5 is a cross-sectional view of a further form of structural product in accordance with the invention;

FIG. 6 is a perspective view, partly broken away, showing still another form of structural product in accordance with the invention;

FIG. 7 is a schematic showing of one form of apparatus suitable for producing the I-beam structure of FIGS. 1 and 2;

FIG. 8 is a top plan view of a portion of the apparatus of FIG. 7, taken substantially along the line 8—8 thereof;

FIG. 9 is a cross-sectional view of a further portion of the apparatus taken substantially along the line 9—9 of FIG. 7;

FIG. 10 is a top plan view showing spools, rotary saws, wedges, and related parts of the apparatus of FIG. 7;

Figure 11:
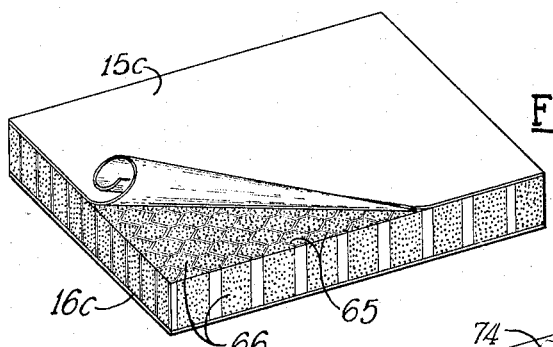
FIG. 11 is a perspective view, partly broken away, showing a modified form of structural product produced in accordance with the invention.

Generally speaking, in one embodiment, with reference to which the invention will first be discussed, the method of the present invention comprises coating a foamable, curable, novolac-containing composition upon a supporting sheet or skin material, such as paper or bonded glass mat, so positioning sheets of the coated skin material that the coating is adjacent each of at least two generally parallel surfaces of a porous core material, such as bonded glass wool board, and heating the resulting assembly to a temperature sufficient to cause foaming and cure of the novolac-containing composition while maintaining the assembly under sufficient pressure to prevent separation of the coated skin material from the core material and to insure an intimate contact between them, thereby causing the expanded foam to penetrate and bond to the porous core material and to bond to the skin material. Complete penetration of the core material by the foam is not necessary to produce structures having excellent compressive and flexural strengths. Instead, the foam and the core material need be combined only in a relatively small area adjacent core surfaces to produce the desired structural strengths, provided that the foam penetrates the core material to a sufficient depth that a significant region of combined foam and core material is produced.

The supporting skins can be any of a variety of sheet materials. Paper, newsprint, cellophane, polyvinylhalides, polyethylene, cardboard, reinforced paper, glass fiber, reinforced inorganic cement, wood, excelsior, glass fiber reinforced polyesters, epoxies, phenolics, scrim fabric, glass cloth, glass mat, flake glass, aluminum foil, plate or sheet, stainless steel foil plate or sheet, wool fiber, asbestos fiber, asbestos paper, and corrugated paper sheets, are just a few of the materials which can be utilized as skins in a product of the invention.

The core material also may comprise a variety of porous products. For example, porous mineral wool, wood fiber, basic glass fiber products, excelsior, or similar type insulating materials, may be utilized. If a glass fiber product is selected, it may be of any density, of any otherwise satisfactory fiber diameter, and of any thickness. Further, if a glass fiber product, it may be a laminar material, end grain board, a molded pipe section, high density white wool or a phenol-formaldehyde bonded board. Broadly speaking, any comparatively rigid, porous structure may be utilized as the core material in accordance with the invention.

The foamable composition, for use according to the subject embodiment of the invention, is a phenolic novolac composition. Such a foamable composition comprises about 80 parts of novolac, a quantity of a curing agent which is reactive with the novolac by connecting molecules thereof through methylene groups, and sufficient in amount to convert, at an elevated temperature, the novolac to a thermoset condition, and from about 0.2 part to about 10 parts of a wetting agent.

The terms "percent" and "parts" are used herein, and in the appended claims, to refer to percent and parts by weight, unless otherwise indicated.

The identity of the novolac which is one of the constituents of a foamable composition for use according to the invention is relatively unimportant, so long as the novolac is one which is curable to a thermoset condition, and can be incorporated into a foamable composition by a desired technique. It is necessary, therefore, that the novolac be produced from reactants which include at least some unsubstituted phenol, which is tri-functional. The most common suitable novolacs are acid condensed, fusible, products of reaction of formaldehyde and phenol in ratios of from about ½ mol to about 1 mol of the former per mol of the latter, and corresponding products where furfural or acrolein have been substituted for at least a part of the formaldehyde. A novolac is essentially insoluble in water, but soluble in some organic solvents, e.g., in alcohols. A foamable composition for use according to the invention is, therefore, essentially anhydrous, but can be either a solid or a solution or dispersion in an organic solvent. A detailed discussion of novolacs can be found in The Chemistry of Phenolic Resins, Robert W. Martin, John Wiley & Sons, Inc., New York, New York, 1956 (see, in particular, pages 99–112, and cited references).

As has been indicated above, a foamable composition for use according to the invention also includes a curing agent for the novolac. Hexamethylenetetramine, resorcinol, and paraformaldehyde are suitable curing agents which are frequently used with novolacs. However, any other known suitable curing agent, for example, a resole, a thermosettable urea formaldehyde material, or the like, can also be employed. Excellent structures, according to the invention, have been achieved when using a foam composition of from about 5 parts to about 20 parts of hexamethylenetetramine with about 80 parts of the novolac. Both water of condensation, which is produced by reaction of paraformaldehyde with a novolac, and nitrogenous gases of condensation, principally nitrogen and ammonia, formed by reaction of hexamethylenetetramine with a novolac, constitute blowing agents which are effective to cause expansion of the composition, for use according to the invention, into a cellular structure. However, an additional blowing agent is preferably, although not necessarily, also employed in the composition in order to facilitate proper penetration of the core material by the foam, and an appropriate apparent density for the penetrated foamed material.

A preferred foamable composition for use according to the invention includes, with 80 parts of the novolac, from about 0.5 part to about 10 parts of a blowing agent. To be effective to supplement the action of hexamethylenetetramine or other curing agent in producing a low density foam for use according to the invention, a blowing agent must be one which is comparatively stable at temperatures below and often comparatively near the temperature range within which the novolac cures rapidly, and which vaporizes or decomposes and forms a gaseous decomposition product at the temperatures encountered during a desired curing reaction, but before cure is effected. It will be appreciated that any of many known blowing agents can be used for this purpose, and that the specific identity of the blowing agent is relatively unimportant so long as its vaporization or decomposition occurs at temperature which are appropriate for the particular novolac being foamed, such temperatures generally being within the range of 65° C. to 250° C. Excellent results have been achieved using between ½ part and about 10 parts of dinitroso-pentamethylenetetramine in a foamable composition containing 80 parts of a particular novolac. It will be understood that the cure of a novolac, in the presence of a curing agent, will proceed at an extremely slow rate at some given temperature, and at progressively increasing rates at high temperatures. The curing reaction is, therefore, a time-temperature phenomenon which can be made to proceed to a desired extent at any of a number of temperatures, provided that a proper time interval at the selected temperature is provided. The rate at which cure proceeds at any given temperature depends upon many factors, including the specific identity of the novolac, the amount and identity of the curing agent available for reaction therewith, the pressure to which the composition is subjected, and various other factors. While, as has been indicated above, the specific identity of the blowing agent used is only of minor importance, the agent must be effective in the particular composition with which it is used, and under the blowing and curing conditions employed. For example, any blowing gas generated either before the novolac-containing composition is fused, or after curing to an infusible condition has occurred, is wasted. The blowing agent used must be one which releases the desired or required quantity of a blowing gas while the composition is fused under the particular curing conditions employed. Since the release of a blowing gas by a blowing agent is, like the cure of the novolac, a time-temperature phenomenon, the heating cycle used to effect blowing and curing can be varied within substantial limits to adapt the blowing action of a particular agent to the fusing and curing characteristics of a particular composition. Instead of the ½ part to 10 parts of dinitroso-pentamethylenetetramine, various other known blowing agents, within the same range of proportions, can be used in a composition for use according to the invention, as indicated in the following table:

| Blowing agent: | Effective temperature range, °C. |
|---|---|
| Azo dicarbonamide 1,1-azobisformamide | 100–200 |
| N,N'-dinitroso-N,N'-dimethylterephthalamide | 65–130 |
| Ammonium carbonate | 58 |
| p,p'-oxybis-(benzenesulfonyl hydrazide) | 100–200 |
| Diazoaminobenzene | 84 |
| Urea-biuret mixture | 90–140 |
| 2,2'-azo-isobutyro-nitrile | 90–140 |
| Azo-hexahydrobenzo-nitrile | 90–140 |
| Diisobutylene | 103 |

As has previously been stated, a foamable composition for use according to the invention also includes a wetting agent. It has been found that the use of a wetting agent, in proportions within the stated range, has a noteworthy effect upon compressive strength of the cured foam which is produced therefrom, in the absence of any core material. In addition, the wetting agents have a marked effect upon cell size and the ability of a composition to expand, enabling the production of cured, low density foams composed of a plurality of small and comparatively uniform cells. In general, any of the known wetting agents or surfactants may be employed in the foam composition for use according to the invention. Particularly excellent results have been obtained when using from about 0.2 part to about 10 parts of a silicone-alkyleneglycol copolymer, produced from a dialkylsilane and a liquid alkylene glycol or polyglycol, where each of the alkyl groups of the silane has from 1 to 2 carbon atoms, or, as defined generically, copolymers of a dialkylsilane and a liquid glycol or polyglycol where the alkyl groups of the silane have from 1 to 2 carbon atoms. Such a wetting agent has a marked effect upon penetration of a porous, glass-fiber board material by the foamable, novolac resin-containing composition. An example of such a copolymer can be represented as made up of a repeating unit having the generic formula:

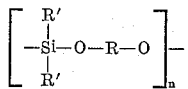

when R is an alkylene radical or a polyoxyalkylene radical, R' is an alkyl radical having from 1 to 2 carbon atoms, and $n$ is an integer. Preferably, $n$ has an average value of from 2 to 10, and, most desirably, from 3 to 5. Such a copolymer can be cyclic in nature, or can be made up of an end-stopped chain. In the former instance the copolymer can be represented as having the following generic formula:

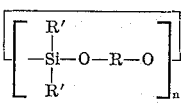

In the latter case, the copolymer can be end stopped in any of several ways, for example, by alkoxysilane groups, by monofunctional silanes, or by glycols. The copolymer, in these instances, can be represented as having one of the following generic formulas:

*Monofunctional silane end-stopped*

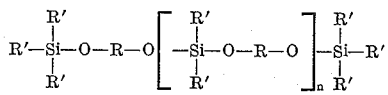

*Alkoxysilane end-stopped*

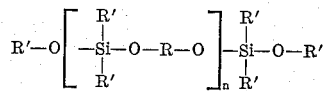

*Glycol end-stopped*

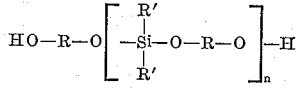

The identity of the alkoxy groups of the silane is not important, but, as a practical matter, they usually have from 1 to 4 carbon atoms. Preferably, the average molecular weight of the copolymer is from about 180 to about 2000, and the glycol has from 2 to 6 carbon atoms, or the polyglycol has from 4 to 16 carbon atoms. The copolymer can also be defined as having a molecular structure which includes the groups

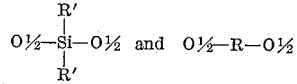

in molar proportions of from 2:1 to 1:2, where R and R' have the meanings previously set forth.

As further examples of wetting agents that can be employed, and in proportions within the range set forth, mention can be made of: polyoxyethylated vegetable oils, polyoxyethylated sorbitan monopalmitate, polyoxyethylene sorbitan monolaurate, n-alkyl trimethyl ammonium chlorides, polyoxyethylene sorbitan monooleate, stearyl dimethyl benzyl ammonium chloride, quaternized amino O, nonylphenoxy polyoxyethylene ethanol, ammonium alkylphenoxy polyoxyethylene, polyoxyethylene glycol esters of fatty acids, tertiary amines, ethylene oxide condensation products of primary fatty amines, polyethylene glycol fatty esters and polyethylene glycol esters of oleic acid, all of which have been used successfully in foams for use in accordance with the invention.

Various materials other than a novolac, a curing agent therefor, a blowing agent and a wetting agent can be incorporated into a foamable composition for use according to the invention. For example, ammonium formate, ammonium benzoate, ammonium lactate, ammonium molybdate, ammonium borate, ammonium carbonate and ammonium acetate have all been used to facilitate blowing, to control cell size, to mask a comparatively unpleasant odor which is attributed to decomposition of hexamethylenetetramine, when used as a curing agent, or for other similar purposes. Ammonium salts of acids weaker than acetic acid are preferred for this purpose over such salts of acetic or stronger acids because of their less corrosive nature. Other materials can be used similarly to mask such odor, or for other specific purposes, as will be apparent to one skilled in the art.

In producing a foamable composition for use according to the invention, thorough mixing to achieve uniformity is important. Since the novolac, at room temperature, is usually a fusible solid from which a solution or dispersion can be formed with a suitable organic solvent, either hot mixing of a molten novolac with the other required constituents, or mixing of a novolac solution or dispersion with the other required constituents to produce a foamable composition for use according to the invention, is a suitable method. However, it is usually preferred, because processing is simpler, to employ a solvent or dispersing medium in producing a core-foam structure according to the invention. If desired, a novolac can be fused, mixed, while fused, with all other required constituents which are neither affected by the temperature of the fused novolac nor reactive therewith to a significant extent at such temperature during the time required for mixing, to form a uniform dispersion of such constituents in the novolac. The uniform dispersion can then be cooled to solidify the novolac, and the resulting solid mixture crushed or otherwise comminuted to a particle size of about 100 mesh, U.S. Sieve Series, or finer. Hexamethylenetetramine or other curing agent for the novolac, and any other temperature sensitive constituent of the foamable composition, in a similarly comminuted condition, can then be dry blended with the powdered solid suspension, for example by tumbling, to produce the desired foamable composition. The hexamethylenetetramine or other curing agent and any other temperature sensitive constituent of the foamable composition can also be mixed with the fused composition, provided that thorough mixing is accomplished rapidly and the resulting mixture cooled before significant reaction or decomposition occurs. The complete hot mix can be knife coated, roller coated, or otherwise applied to a suitable skin material while in a fused condition, and cooled, can be applied directly to a suitable core material and cooled, or can be cooled and comminuted, preferably to about 40 mesh or finer, U.S. Sieve Series, and then applied directly in powder form, or as a solution or dispersion in a suitable organic solvent, such as alcohol. Also, all ingredients of a foamable composition can be dissolved or dispersed, for example in an alcohol, and the resulting solution or dispersion knife coated, roller coated, or otherwise applied to a suitable skin or core material.

Referring now to FIG. 1 of the drawings, the I-beam product shown comprises a pair of spaced supporting skins 15 and 16, such as paper or cardboard, with a plurality of sections of a core material, such as phenol-formaldehyde bonded glass wool board, shown generally at 17, extending longitudinally thereof and interposed between the skins 16 and 15. Interposed transversely between the glass wool core sections 17 and extending longitudinally therewith at right angles to the surface of the skins are a series of strips indicated generally at 18 of skin material which, for example, may be thin strips of phenolic bonded glass mat, or any of the previously listed skin materials.

The internal structure of the I-beam product of FIG. 1 is best described with reference to the cross-sectional view of FIG. 2. As indicated generally at 20, a cured novolac foam penetrates each of the core sections 17, extending downwardly from the top skin 15, upwardly from the bottom skin 16, and inwardly from each of the skins 18. The regions 20 of the structure have been found to have exceptionally high strength by comparison either with the core material 17 or with the foam when not reinforced. It should be noted that in this particular embodiment, the glass wool boards were placed on end so that the fibers extend mainly vertically in relation to the assembly. In this structure, a region of high strength is provided adjacent each major surface, and each such region is supported relative to the other by a plurality of similar longitudinally extending regions of high strength. The fibers adjacent each of the major surfaces are compressed, so that the percent of glass, and the strengths, of the regions of combined foam and core material are increased.

FIG. 3 shows several of the components of the I-beam structure of FIGS. 1 and 2, prior to assembly, 21 designating a thin layer of a foamable, curable novolac-containing composition applied to one surface of the porous skins 18, said skins being interposed transversely between the sections of core material 17. It is to be understood that, when a porous reinforcing material is utilized, only one surface of the same need be coated with the novolac-containing composition, since peneration of the novolac-containing composition, upon foaming, through the porous reinforcing strip material will be effected, thereby insuring penetration of the foam into the core material disposed on both sides of the reinforcing strips. However, when a non-porous reinforcing strip is utilized, the novolac composition must be applied to both surfaces adjacent the core material. For example, excellent results have been obtained when using aluminum sheet as the reinforcing material in the I-beam structure. Since the aluminum sheet is not porous, the use of the same requires the coating of the novolac composition on both sides of the sheet disposed adjacent to the core material.

FIG. 4 shows all of the components of the I-beam structure as it appears just prior to subjection to heat to cause foaming and cure of the novolac composition 21 and penetration of the same into the sections of core material 17. The top skin 15 is shown (cut away) applied to the upper surfaces of the assembled core material sections 17 and skins 18, and has a thin layer of the novolac-containing composition 21 coated on its under side. The bottom skin 16 likewise has a thin layer 21 of the novolac-containing composition coated on its upper surface adjacent the bottom surfaces of the assembled core material sections 17 and reinforcing skins 18. The assembly of FIG. 4 can be converted to the article of FIGS. 1 and 2 in a suitable mold, wherein the skins 15 and 16 are supported relative to, and urged against, the core material 17, and the outermost sections 17 of the core material are urged toward one another. Such conversion is accomplished by heating at least the novolac composition to a suitable temperature and for a sufficient time to cause foaming and cure thereof. The novolac advances into the core material 17, while cellular, and then cures, producing the structure shown in FIGS. 1 and 2.

Another form of structural product in accordance with the invention is shown in cross section in FIG. 5. Here, it will be noticed, no intermediate skin corresponding with the skin 18 of the structure of FIGS. 1 and 2 has been used, the structure merely comprising a pair of spaced skins 15a and 16a with a section of core material 17a interposed between them, the core section being joined to the skins through the penetration of the novolac foam into the core material, as shown generally at 20a, forming high strength surface regions, as discussed above. Although this particular product does not possess compressive strength equal to that found in the I-beam structure, it is sufficient for many applications where such high compressive strength is not necessary, and, of course, has the further advantage of lower cost and ease of production.

Still another form of structural product in accordance with the invention is shown perspectively in FIG. 6, with parts broken away to show details of the structure. Here, it will be noticed, that reinforcing skins 22 are interposed longitudinally as well as transversely, as shown at 18b, between core sections 17b and extend transversely across the structure at right angles to the surface of the skins 15b and 16b. Further, shown generally at 20b, may be seen the novolac foam reinforcing the core material. In this particular embodiment, both the group of reinforcing skins extending longitudinally, as indicated at 18b, and the group of reinforcing skins extending transversely, as indicated at 22, were coated with the novolac composition prior to assembly, thereby forming, upon heating to cause foaming and curing, an exceptionally rigid and strong body, the majority of which is composed of foam reinforced core material.

The appartus shown schematically in FIG. 7 represents one form of apparatus suitable for carrying out a method of producing the I-beam structure shown in FIG. 1. A continuous board of core material, such as, for example, phenol-formaldehyde bonded glass fiber wool board, shown generally at 25, is fed by any suitable conveying means (not shown) through a series of predeterminately spaced, parallel rotary saws 26 mounted upon a common shaft 27, driven by any conventional means (not shown). The rotary saws are so positioned as to completely sever the board 25 into a series of core sections 17, the lowermost extending portion of the rotary saw blades extending into slots (not shown) provided in a base support 28. The severed sections 17 are then forced apart by wedges 30 (FIGS. 8 and 10), carried by a bridge 38, so that a predetermined spacing is provided between the sections of core material 17. Positioned above the sections of core material and in alternately, vertical offset relation to each other are a series of spools 31, the number of spools corresponding to the number of separations formed in the board 25 of core material. The spools are freely, rotatably mounted by means of spindles 32 (FIGS. 7 and 10) which are pivotally connected to, and extend vertically from, a horizontal member 33, said member 33 being supported by a pair of vertically extending posts 34 and 36 on either side of the base support 28. The spools 31 supply strips of reinforcing material, such as, for example, phenolic bonded glass mat, aluminum sheet, cardboard, asbestos fiber, or the like, coated on either one side or both sides, depending upon whether or not the said reinforcing material is porous, as previously explained, with the novolac-containing foamable composition. The thickness of the coating will vary, depending chiefly upon the degree of penetration sought, and other various factors. Coating thicknesses in the range of from about 5 to about 225 gms. per square foot of the foamable novolac-containing composition have been used successfully. The strips of reinforcing material (see FIG. 7) are guided into the separations, formed between the sections 17 of core material by the wedges 30, by means of a manifold 37, said manifold having an upper interior surface 40 which is slanted gradually downward in the direction of the strip and core section movement (see, also, FIG. 9), so that the height of the said upper slanting surface 40 from the base support 28, at the exit end of the manifold, exactly corresponds to the height of the core sections. By this means, the strips of reinforcing material are made to assume proper vertical alignment between the core sections, the vertical dimension of the strips being previously determined and fixed to correspond to the height of the core sections. After the strips have been aligned between the core sections 17, rolls 41 and 42 urge the core sections together with the interposed strip reinforcing material, so that the sections 17 are compressed together and caused to form a composite assembly, such as shown in FIG. 4, but without the top and bottom skins having yet been applied.

Referring again to FIG. 7, after passing between the rolls 41 and 42, the assembly is next provided with top and bottom, novolac-coated skins in the manner now to be described. Hoppers 43 and 45 are charged with any suitable liquid coatable, foamable, novolac-containing composition, which is then flowed onto the supporting skins 15 and 16, as designated generally at 46 and 47. The skin material may be composed of paper, cardboard, asbestos fiber, or the like, as previously noted, and has as its source, supply rolls 48 and 50. The foamable composition flows onto the skins 15 and 16 at a point where the skins are passing over stationary supports 51 and 52, and is spread into a thin uniform layer by doctor blades 53 and 55. By controlling the distance between the supporting surfaces 51 and 52 and the blades 53 and 55, any predetermined amount of the foamable composition can be applied to the skins, it again being noted that amounts in the range of from about 5 to about 225 gms. per square foot have been used successfully. It should be noted that when the novolac composition is coated in fused form, the hoppers 43 and 45, doctor blades 53 and 55, and supporting surfaces 51 and 52 must be heated to a suitable temperature, such as, for example, 100-120° C., in order to maintain the composition in the fused state.

If desired, roller coaters can be used instead of the doctor blades 53 and 55.

The coated skin 15 is then passed over rolls 56 and 57, the latter being so located in relation to the composite assembly of core sections and interposed reinforcing strips that, upon passage of the coated skin 15 over the roll 57, the said skin is caused to be disposed onto the upper surface of the composite assembly under sufficient pressure so that an intimate contact is established between the said upper surface of the composite assembly and the coated side of the skin 15, and the fibers adjacent the skin 15 are compressed as shown in FIG. 2.

Referring again to FIG. 7, in the same manner, the coated skin 16 is passed over rolls 58, 60 and 61, the roll 61, as in the case of the roll 57, being so located in relation to the composite assembly of core sections and interposed reinforcing strips that, upon passage of the coated skin 16 thereover, the said skin is caused to be disposed onto the bottom surface of the composite assembly under sufficient pressure so that an intimate contact is established between the said bottom surface of the composite assembly and the coated side of the skin 16, and the fibers adjacent the skin 16 are compressed. It should be noted that the transverse dimension of the skins 15 and 16 is made to correspond to the width of the composite assembly of core sections and interposed reinforcing strips. After both top and bottom skins have been applied, the assembly, which at this point appears as shown in FIG. 4, is ready to be heated to cause foaming and cure of the novolac composition and penetration of the same into the porous core material.

For the purpose of heating the assembly to cause foaming and cure of the novolac-containing composition, a pair of spaced, heated platens 62 and 63 is provided. The assembly is heated by the platens so as to bring the novolac-containing composition to a temperature within the range of from about 300 to about 450° F., said composition being maintained at a temperature within such range for a time sufficient to effect curing of the novolac, usually not longer than about 30 minutes. The heating of the platens has been accomplished successfully by circulating steam through suitable jacketing of the platens, and also dielectrically. Dielectric heating is preferred, most desirably in conjunction with platens, because a satisfactory cure can be effected in from 1 minute to 3 minutes in this way. During the heating period, the assembly is maintained under sufficient pressure by the platens 62 and 63 to prevent separation of the coated skin material from the core material, to insure intimate contact between them, and to cause compression of fibers, as discussed above. At the same time a spaced pair of suitable rigid side plates (not shown), arranged at right angles to the platens on either side of the assembly, prevents expansion of the assembly in a sideward direction, as might otherwise occur due to the foaming of the novolac-containing composition present on the interposed reinforcing strips. Due to the restraining effect imposed by the platens 62 and 63 and the side plates, the expanding foam is forced to penetrate downwardly from the top skin 15 and upwardly from bottom skin 16, as generally shown at 20, as well as sidewardly from the reinforcing strips, into the porous core sections, effecting high strengths in the regions of penetration and causing a cured, combined fiber and cellular I-beam product as shown in FIG. 1 to be produced.

It should be noted that structures according to the invention do not necessarily include the spaced supporting skins 15 and 16 on the top and bottom parallel surfaces. To provide structures without such skins, the foamable novolac-containing composition is coated directly on the top and bottom surfaces of the core material, and the resulting product inserted between a pair of spaced heated platens, again sufficient pressure being supplied by the said platens to cause the foam to penetrate into the core material, and preferably, to compress or compact fibers adjacent the platens. It is important, in curing and foaming such structures without skins or supporting sheets, that the platens be coated with a suitable mold-release agent, e.g., a silicone, in order to prevent the novolac foam from adhering to the platens.

Still a further form of structural product in accordance with the invention is shown perspectively in FIG. 11. The structure shown therein comprises essentially a honeycomb core pattern 65, composed of any suitable material, such as, for example, paper laminates, aluminum foil, lightweight sheet steel, reinforced plastic or glass fiberboard, or the like, interposed between a pair of spaced parallel skins 15c and 16c, and at right angles thereto. The skins, again, may be composed of a variety of materials, such as, for example, sheet aluminum or steel, paper laminates, flake glass, glass fiber board or the like. Enclosed within each void area of the honeycomb pattern, and completely filling the same, is the cured and foamed novolac-containing composition shown generally at 66. The novolac foam-filled honeycomb panel above described has been found to be an extremely lightweight, structurally strong product, having excellent insulating properties.

Various methods may be employed in producing the novolac foam-filled honeycomb structure of FIG. 11. For example, a fused foamable novolac-containing composition may be knife or roller coated onto the bottom skin so as to produce a uniformly distributed coating of predetermined thickness, sufficient, upon foaming, to completely enclose and fill the void areas of the honeycomb structure next to be applied. The honeycomb structure is then placed directly on top of the uniformly coated, novolac-containing composition and the top skin applied. The structure is then heated to cause cure and foaming of the novolac composition, the skins being maintained in proper spaced relation on either side of the honeycomb pattern by means adapted to apply suitable pressure thereto.

Another method that may be used to produce the novolac foam-filled honeycomb structure is simply to place the honeycomb pattern upon an uncoated bottom skin, and then inject a predetermined amount of a suitable, foamable novolac-containing composition into each void area of the honeycomb pattern. A top skin is then applied to the top surface of the pattern and the resulting assembly heated to cause cure and foaming of the novolac composition as before described.

Various other structures than those shown in the attached drawings may also be produced in accordance with the invention. For example, a block or slab of a core material, such as a phenol-formaldehyde bonded, glass fiber board, can be perforated in a desired pattern and the resulting perforated board placed down upon a supporting skin, the adjacent top side of which has been either knife coated with a predetermined amount of a coatable, foamable novolac-containing composition, or which has been dusted with a predetermined amount of a powdered, solid foamable novolac-containing composition. A second coated skin is then placed on top of the perforated board with the coated side adjacent the said perforated board. The assembly is then placed in a heated mold, or between suitable heated platens, and heated to a temperature sufficient to cause cure and foaming of the novolac-containing composition. Upon foaming of the novolac-containing composition, coated on the surfaces of the spaced skins adjacent the board, that part of the foam in contact with the board itself penetrates into the board, forming a capped structure, while the part of the foam near the perforation is free to penetrate up through, and into the regions of the board adjacent the perforations. The foam, orginating from both spaced skins, joins in the perforations, and being under great pressure to expand farther, forces itself out into the surrounding board, penetrating the said board and forming novolac foam reinforced, glass fiber columns. By varying the number and shape of these columns, the strength of the resulting structure can be controlled within broad limits.

It is also possible to form a columnar type structure as described above without actually damaging the glass fiber board by perforating it. For example, the foamable novolac-containing compositions may be injected in powder form, dissolved in a suitable solvent, or in its fused state, into the interior of the board by means of hypodermic needles or suitable high pressure guns, or the composition, in the form of a fine powder, can be dusted onto the board, in a desired pattern, and sifted thereinto. In any case, the desired structure is then produced by appropriate heating as described.

The following examples describe the best presently known modes for practicing the instant invention, and describe the formulation and production of a curable, foamable, novolac-containing composition, the method of assembling the various structural parts, together with the application of the novolac-containing composition to certain of said parts, and finally the conversion of the foamable novolac composition into an expanded, cured condition resulting in the high strength, novolac foam reinforced, vitreous fiber insulating structure of the invention, as well as the production of a similar structure from a completely different binder.

*Example 1*

A quantity of a dehydrated novolac, hereinafter for convenience referred to as "Novolac A," and subsequently described in more detail, was melted by heating to a temperature of substantially 140° C. A 76 part portion of the fused Novolac A was then transferred to a 10 gallon mixing vessel and allowed to cool, under agitation, to about 110° C. When the fused novolac was of uniform consistency throughout and at a temperature of approximately 110° C., 2 parts of a silicone material which is hereinafter for convenience referred to as "Silicone A," and subsequently described in more detail, 2 parts of minus 200 mesh ammonium acetate, and 2 parts of minus 200 mesh diisobutylene were quickly added to the fused novolac and were mixed thoroughly by means of a motor driven, propeller-type agitator. Eighteen parts of a minus 200 mesh mixture of hexamethylenetetramine and dinitroso-pentamethylenetetramine (the mixture consisting of 16 parts of hexamethylenetetramine and 2 parts of dinitrosopentamethylenetetramine) was then quickly added to the mixture of the novolac, Silicone A, ammonium acetate, and diisobutylene, and thoroughly agitated, care being taken that the resulting mix was of uniform consistency before it cooled below a temperature at which the viscosity of the same was such that thorough and complete mixing could not be accomplished. The resulting mixture, consisting of 76 parts of Novolac A, 16 parts of hexamethylenetetramine, 2 parts of Silicone A, 2 parts of dinitrosopentamethylene-tetramine, 2 parts of diisobutylene, and 2 parts of ammonium acetate was a foamable, curable novolac-containing composition.

A portion of the fused novolac-containing composition was then knife coated onto one surface of a phenol-formaldehyde bonded glass fiber board to a thickness of about 30 grams per square foot, a second such board was then superimposed upon the first, with its under side in contact with the coated surface of the first. This procedure was repeated until a lamellar structure composed of 24 of the boards and 23 layers of the novolac composition was produced. A fragment of such lamellar structure is indicated generally at 70 in FIG. 12, wherein each of the boards is designated 71, and each of the layers of the novolac composition is designated 72. Each of the boards 71 had an apparent density of 10½ pounds per square foot, and was 2 feet by 4 feet by 1 inch in size. The structure 70 was then cut into 24 slices, each approximately one inch thick. Each cut was parallel to an edge 73 of one of the boards 71, and perpendicular to a major surface 74 thereof. Each slice, a fragment of one of which is designated 75 in FIG. 13, was compressed to about 92 to 95 percent of its original width (as indicated by the arrows) to insure an intimate contact between adjacent sections, designated 76, of the glass wool board and the interposed layers, designated 77, of the novolac composition.

Another portion of the fused novolac-containing composition was also knife coated onto one surface of kraft paper supporting skins to a thickness of about 30 gms. per square foot. One skin was placed onto the upper surface of each slice 75, and another was placed on the under surface thereof, so that the coated sides of the kraft paper supporting skins were adjacent the said upper and under surfaces, respectively, of the slice.

The resulting assembly was then placed between a pair of spaced platens, and heated dielectrically to a temperature of about 360° F. for approximately 2 minutes, sufficient pressure being supplied from the spaced platens and a pair of spaced side support members to prevent any separation occurring between the parts of the assembly, and to compress fibers, as discussed above and as shown in FIG. 14. A completed I-beam structure was then removed from the platens, the structure being shown in FIG. 14 of the attached drawings. The expanded, cured novolac foam was found to have penetrated into the glass wool board sections approximately ¼", and to have formed a rigid, high strength structure having the following physical properties:

K value, B.t.u. per hour per sq. ft. per inch of thickness, per ° F.—0.30.
Flexural strength—1014 p.s.i.
Compressive strength, in lbs. per sq. in., required to cause a 10% compression of the I-beam structure—72 p.s.i.
Water absorption—12%.
Swelling, upon absorption of 12% water—0.8%.
Apparent density—16.1 lbs. per cubic foot.

A similar I-beam structure, produced from the same foaming composition and structural components, but wherein the glass fibers extended generally horizontally in each slice, showed the following physical properties:
K value—0.40.
Flexural strength—862 p.s.i.
Compressive strength, 10% deformation—172 p.s.i.
Water absorption—12%.
Swelling, upon absorption of 12% water—0.2%.
Apparent density—14.1 lbs. per cubic foot.

Figure 12:
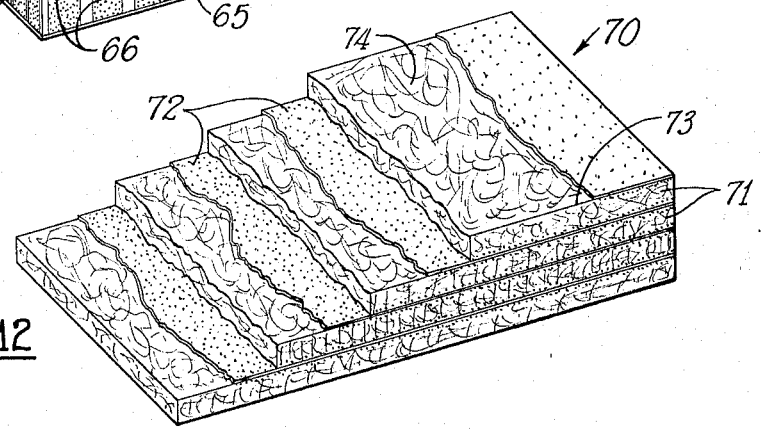
FIG. 12 is a view in perspective showing a partially fabricated article, illustrating its condition during one step in a preferred method for producing an article according to the invention.
Figure 13:
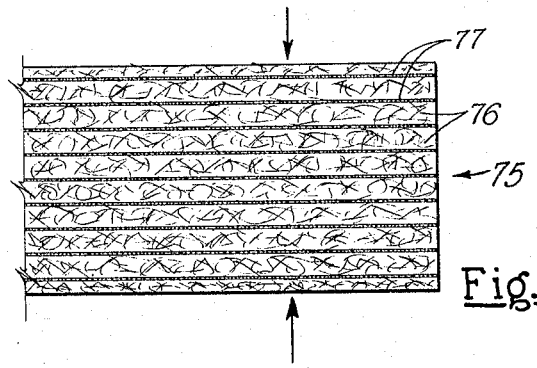
FIG. 13 is a plan view of a fragment of the partially fabricated article of FIG. 12.
Figure 14:
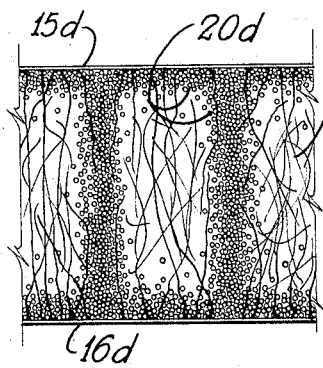
FIG. 14 is a sectional view similar to FIG. 2, but showing details of the article produced by the preferred method illustrated by FIGS. 12 and 13.

If desired, the assembly shown in FIG. 12 can be heated to foam and cure the novolac composition, so that slices cut therefrom (as shown in FIG. 13) are structurally integral core bodies, the bodily separate masses being attached to one another as in the FIG. 14 structure.

The procedures described above have also been repeated using, as the foamable composition, the following solution or dispersion:

| | Parts |
|---|---|
| Novolac A | 77 |
| Ethyl alcohol | 33 |
| Silicone A | 4 |
| Dinitroso-pentamethylene-tetramine | 4 |
| Hexamethylenetetramine | 8 |

For comparative purposes, the flexural strength of the phenol-formaldehyde bonded glass wool boards, not reinforced with the novolac foam, varies from 75 to 100 p.s.i., with the compressive strength varying from 2 to 6 p.s.i. at 10 percent deformation.

Novolac A was produced in a jacketed, 10 gallon glass-lined kettle fitted with an anchor-type agitator, a thermometer and a reflux condenser from a charge of 20.29 kilograms of U.S.P. phenol, 12.95 kilograms of 37 percent formalin (a 37 percent solution of formaldehyde in water) and 0.1 kilogram of oxalic acid. The phenol and the formaldehyde were mixed at about 40° C. in the reaction kettle, and the oxalic acid, in a granular condition, was added. The agitator was driven to accomplish this mixing, and was continued until reaction between the phenol and the formaldehyde was substantially complete, and a novolac had been formed. Water at a temperature of about 50° F. was also circulated through the jacket of the reflux condenser from the beginning of the mixing operation until substantial completion of the reaction between the phenol and formaldehyde and production of the novolac. The kettle was then heated by circulating low pressure steam through the jacket to bring the reaction mixture to a temperature ranging from 94° C. to 96°, C. and water or steam was then used, as required, to maintain the reaction mixture at a temperature within such range for a period of 6½ hours. Agitation of the reaction products in the kettle was then stopped, and the reaction products were allowed to stand for about 1 hour. During this time a phase separation occurred, an aqueous layer rising to the top, and an organic layer collecting in the bottom of the kettle. The aqueous top layer was then siphoned from the kettle; agitation was resumed; and steam was introduced into the jacket of the kettle to bring the reaction products to a temperature of approximately 120° C. in a period of about 2½ hours. The reaction products were maintained at about 120° C. by suitable adjustment of the flow of steam to the kettle jacket, while gases and vapors were exhausted from the upper portion of the kettle to decrease the pressure therein gradaully, over a period of about 15 minutes, until a vacuum of 28" of mercury was reached, and for an additional hour while a vacuum of about 28" of mercury was maintained.

Figure 15:
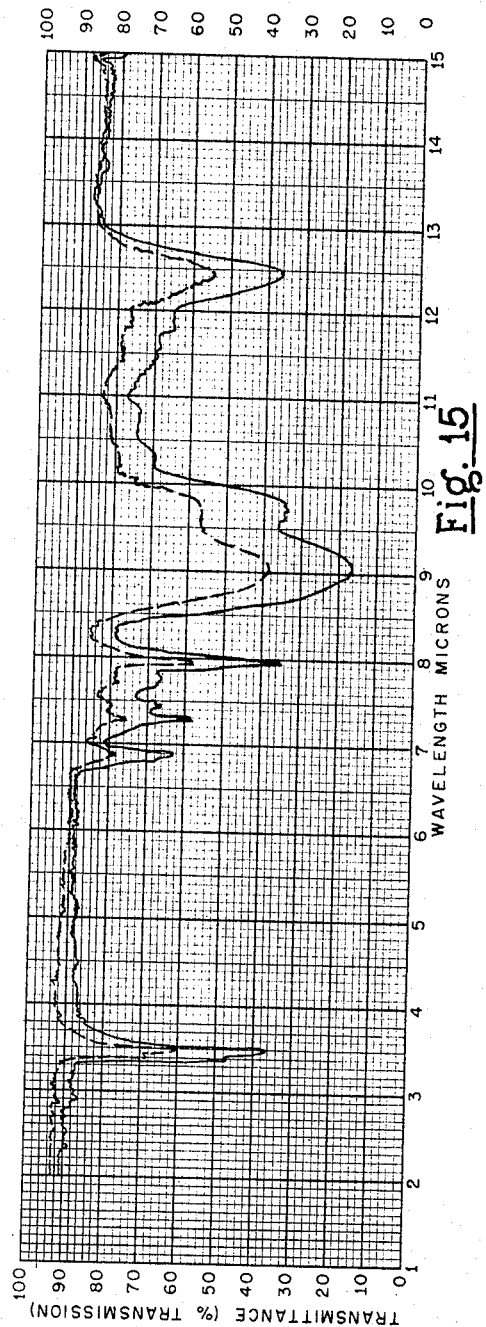
FIG. 15 is an infra red transmittance pattern of a silicone which is a particularly effective wetting agent in a composition according to the invention.
Figure 16:
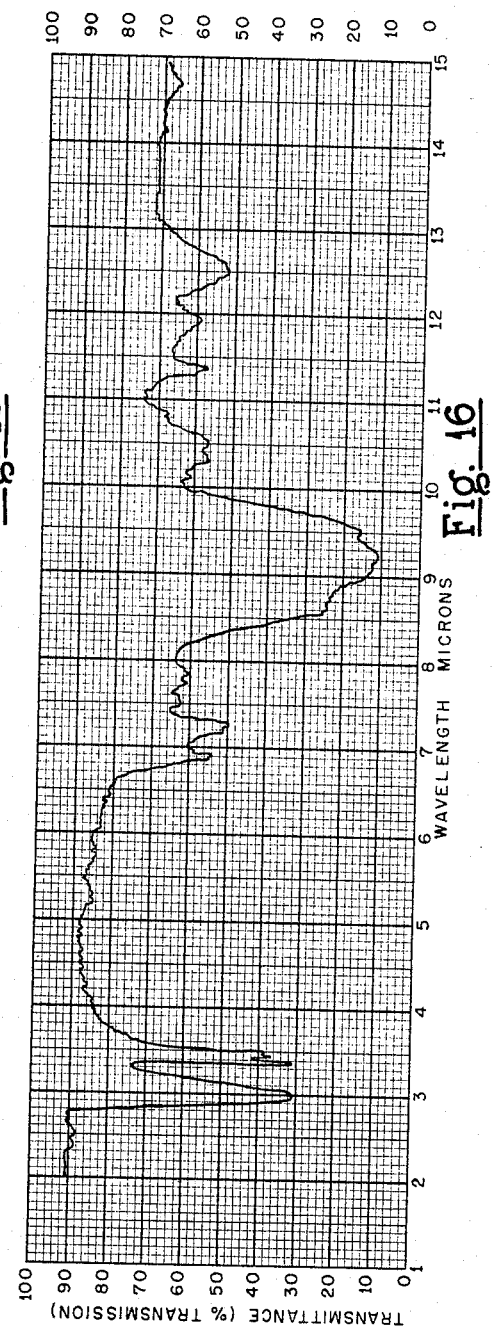
FIG. 16 is an infra red transmittance pattern of a silicon compound which is another particularly effective wetting agent in a composition according to the invention.

Silicone A is a copolymer of substantially equimolecular proportions of adimethyldialkoxysilane and a glycol having a viscosity of about 620 centipoises at 100° F. Silicone A can be identified and purchased commercially by reference to the foregoing description or to its infra red transmittance pattern, which is represented in FIG. 15 of the attached drawings, and which suggests that at least some molecules of Silicone A have a cyclic structure.

Similar results have also been achieved using various commercially available novolacs, the only requirement of the particular novolac used being that it is curable to a thermoset condition, and can be incorporated into a foamable composition by a desired technique.

It has also been demonstrated that the procedures reported in Example 1, above, can be carried out, and with generally the same results, using a composition identical with that set forth except that the same weight of a different type of silicon compound is substituted for Silicone A. A silicon compound of such different type can be produced by reacting about 2 mols of a lower fatty alcohol with 1 mol of silicon tetrachloride to produce a compound having the formula

where R is alkyl, and then reacting 1 mol of the compound with from about 1 mol to about 2 mols of a glycol or polyglycol. It will be appreciated that the resulting silicon compound is similar to Silicone A and to the previously discussed silicones, which constitute a preferred class of wetting agents for use in a foamable novolac composition, except that the alkyl radicals attached to silicon atoms have been replaced by alkoxy groups. Preferably, the alkoxy groups have from 1 to 4 carbon atoms. Excellent results have been achieved by the procedures described in the foregoing example, with such a silicon compound produced by dripping, at room temperature of about 25° C., 1 gram mol of silicon tetrachloride and a mixture of 2 gram mols of methyl alcohol and 1 gram mol of propylene glycol into a stirred, 100 gram portion of benzene, and, after gas evolution ceases, vacuum distilling to remove the benzene.

Cellular bodies can also be produced by introducing a charge of a foamable, novolac-containing composition as discussed above into a suitably enclosed zone, and heating the composition to a temperature and for a time sufficient to cause foaming and cure of the charge. The charge foams into a cellular structure having an apparent density which depends upon the quantity of the charge relative to the volume of the mold.

A structure according to the invention has also been produced without the use of any foamable composition according to the following procedure:

Example 2

A slurry was prepared from 100 parts of neutral, high strength, gypsum hemi hydrate ($CaSO_4 \cdot \tfrac{1}{2} H_2O$) and 40 parts of water. A part of this slurry was then knife coated onto matching edges, and worked into regions adjacent such edges of phenolic-bonded glass fiber board strips. The coated strips were then assembled into a structure similar to that shown in FIG. 3 of the attached drawings, except that the gypsum slurry replaced the mats coated with a foamable novolac resin composition, and except that the gypsum slurry had been worked into regions adjacent the abutting edges of each of the strips. The resulting structure was then compressed to about 90 percent of its original width in a direction at right angles to the abutting edges of the strips, and maintained in such compressed condition until the gypsum had set. A thin layer of a similar gypsum slurry was then knife coated onto the upper and lower major surfaces of the structure, and worked into the interstices between fibers in regions adjacent such surfaces. A layer of the slurry was then cast onto a plane surface to a depth of about $\tfrac{1}{16}''$, and corresponding in length and width with the length and width of the structure, and lengths of glass fibers were pressed into the slurry layer. The structure was then positioned on the slurry layer, with one of the coated surfaces in contact and aligned therewith. Bundles of glass fibers were then positioned randomly on the upper gypsum surface of the structure, and additional gypsum slurry knife coated over the fibers to a total slurry thickness of approximately $\tfrac{1}{16}''$. After hardening of the several gypsum layers, the product was found to have properties similar to those of the article shown in FIGS. 1 and 2 of the drawings hereof, differences being explainable on the basis of the differences between the properties of a gypsum plaster and the properties of a foamed, hardened, phenolic material.

The experimental procedure described above as Example 2 demonstrates the significance, in producing an article according to the invention, of the foamable, curable, novolac resin composition which has previously been discussed in detail. Such a structure or article can be produced with comparative ease when such a foamable composition is employed because the autogenous pressure thereof, developed during foaming and cure, when the composition is appropriately positioned and confined adjacent a surface of a porous core material, causes the composition to force itself into interstices in the core material, and, upon completion of cure, to form a region of combined, cured phenolic material and core material. Particularly when the core material is fibrous in nature, e.g., made up of glass or other fibers, the fibers and the cellular phenolic material mutually reinforce one another so that each such region is one of high strength. It will be appreciated that the fiber loading in a region of combined cellular phenolic material and fibrous core material determines the strength of such region, other factors being equal. Accordingly, structures wherein fibers within such a region are compressed or compacted (see FIGS. 2 and 14) are highly significant because the compression or compaction of the fibers tends to increase the fiber loading in such region and correspondingly to increase the strength thereof. Because of the autogenous pressure developed by a foamable, curable, novolac resin composition during cure thereof, it is a comparatively simple matter to form such a region of combined cellular, hardened, phenolic resin and core material. However, Example 2 hereof demonstrates that such a region can be produced otherwise. It will be apparent to one skilled in the art, therefore, that any of numerous available binder materials can be used in producing such a structure, and that such binder materials can be either organic or inorganic in nature, and can be of the type converted to a hardened condition by a chemical reaction, as in the case of various thermosetting organic resinous materials and numerous inorganic cements, or of the type converted to a hardened condition by cooling, e.g., thermoplastic organic resinous materials. Gypsum, Portland cement and various oxy cements, e.g., oxychloride, oxysulfate or oxyphosphate cements, specifically, magnesium oxychlorides, magnesium oxysulfates and magnesium oxyphosphates, constitute preferred inorganic cementitious materials for use as binders in producing a structure or article according to the invention. Structures produced from such inorganic cements are particularly advantageous, especially when the core material is a mass of vitreous fibers, because the entire structure is, or can be, inorganic, non-combustible, or both, in nature. It will also be appreciated that the binder can be effective because it adheres to the fibers or other core material, because it fills the voids in the fibrous or other core material, thus preventing relative movement of individual components thereof, or both.

It has been found to be essential that adjacent, bodily separate fiber packs (e.g., as in the structures of FIGS. 1 and 2 and 14) be as close together as is feasible in a structure according to the invention. For example, the glass wool or wool board sections 17d (FIG. 14) and other equivalent sections should be separated from one another by not more than $\tfrac{1}{16}''$, and preferably by not more than $\tfrac{1}{32}''$. Most desirably, such core sections contact one another or strips 13 (FIGS. 1 and 2), if used. In general, the less the distance between adjacent sections, the greater is the strength of the structure.

It will be apparent that various changes and modifications can be made from the specific details discussed herein, and shown in the attached drawings, without departing from the spirit and scope of the appended claims.

We claim:

1. An article of manufacture comprising, as a core material, a plurality of bodily separate masses of intermeshed vitreous fibers, which masses are disposed in closely adjacent, side-by-side relationship, the fibers in said masses being bonded to one another at points of contact by a first binder material, first and second bodies of a hardened binder intimately associated with, bonded to, and supporting fibers in each of said masses of core material, adjacent each of two opposed surfaces of each mass, one of said binder bodies substantially filling voids between fibers adjacent each of said opposed surfaces and extending a distance sufficient to provide a high strength region of combined binder and core material, and a rigid foam extending into juxtapositions of adjacent masses of fibers to interconnect the same, said rigid foam laterally bridging the individual fibers of said regions at points intermediate the points of connection of said fibers by said first binder.

2. An article of manufacture comprising, as a core material, a plurality of bodily separate masses of intermeshed vitreous fibers, which masses are disposed in closely adjacent, side-by-side relationship, the fibers in said masses being bonded to one another at points of contact by a first binder material, first and second bodies of a cured, infusible, phenolic condensation product, produced by cure of a novolac intimately associated with, bonded to, and supporting fibers in each of said masses of core material, adjacent each of two opposed surfaces of each mass, one of said bodies substantially filling voids between fibers, and extending adjacent each of said opposed surfaces a distance sufficient to provide a high strength region of combined phenolic product and core material, and a rigid foam produced by causing a foamable novolac to foam inwardly between fibers of adjacent masses of core material from the region between said masses, and curing the foamable novolac in the foamed condition to produce a porous body of binder material extending into juxtaposed regions of adjacent masses of fibers to interconnect the same, said porous body of foamed novolac laterally bridging the individual fibers of said regions at points intermediate the points of connection of the fibers by said first binder.

3. A method for producing a combined fiber and cellular article which comprises the steps of assembling a plurality of sections, each of which is composed of a mass of bonded, intermeshed, vitreous fibers in side-by-side relationship, coating a foamable, curable, novolac-containing composition upon at least one surface of a plurality of reinforcing strips, positioning one of the coated reinforcing strips between each pair of adjacent sections, coating one surface of each of a pair of supporting skins with a foamable, curable, novolac-containing composition, applying the coated skins to parallel surfaces of the assembly of vitreous fiber sections and interposed reinforcing strips so that the coated surface of each supporting skin is adjacent the said assembly, and then heating the resulting assembly to cause foaming and cure of the novolac-containing composition and penetration of the resulting cellular, expanded foam into the sections of bonded, intermeshed, vitreous fibers.

4. A method for producing a combined fiber and cellular article which includes the steps of assembling in side-by-side relationship a plurality of sections, each of which is composed of intermeshed, generally parallel vitreous fibers which extend generally parallel to the sides of said sections and which are bonded at points of contact, positioning a layer of a foamable, curable, novolac-containing composition between each pair of adjacent sections, positioning a layer of a foamable, curable, novolac-containing composition above, and a second such layer below the assembly of a vitreous fiber sections and interposed novolac composition layers, and then heating the resulting assembly to cause foaming and cure of the novolac-containing composition and penetration of the resulting cellular, expanded foam into the sections of bonded, intermeshed, vitreous fibers to produce a porous body laterally bridging the individual fibers between their points of contact.

5. A method for producing a combined fiber-binder article which includes the steps of arranging side surfaces of a pair of boards comprising fibers bonded together at spaced apart points of contact adjacent each other with a foamable hardenable novolac resin binder positioned between the juxtaposed boards, causing the hardenable novolac resin binder to be foamed by autogenously produced pressure and thereby forced into both adjacent boards and laterally over fibers between locations wherein the fibers are bonded to each other to form a cellular structure laterally bridging the fibers between said points where said fibers are bonded together, and causing said laterally bridging cellular structure of foamable novolac binder to harden.

References Cited by the Examiner
UNITED STATES PATENTS

| | | | |
|---|---|---|---|
| 2,338,960 | 1/1944 | Nottebohm | 156—79 |
| 2,361,438 | 10/1944 | Turner | 161—161 |
| 2,373,500 | 4/1945 | Pearce. | |
| 2,376,653 | 5/1945 | Boyer | 161—161 |
| 2,582,228 | 1/1952 | Brinkema | 264—52 |
| 2,693,922 | 11/1954 | Ellison | 161—161 |
| 2,744,042 | 5/1956 | Pace | 161—161 |
| 2,762,739 | 9/1956 | Weiss | 161—161 |
| 2,782,465 | 2/1957 | Palmer | 20—35 |
| 2,879,197 | 3/1959 | Muskat et al. | 156—79 |
| 3,061,475 | 10/1962 | Wallace | 156—79 |
| 3,062,698 | 11/1962 | Aykanian | 156—79 |
| 3,070,475 | 12/1962 | Carlson et al. | 156—79 |

HAROLD ANSHER, *Primary Examiner.*

DOUGLAS J. DRUMMOND, EARL M. BERGERT,
*Examiners.*